(12) United States Patent
Raynaud-Richard et al.

(10) Patent No.: US 8,140,494 B2
(45) Date of Patent: Mar. 20, 2012

(54) PROVIDING COLLECTION TRANSPARENCY INFORMATION TO AN END USER TO ACHIEVE A GUARANTEED QUALITY DOCUMENT SEARCH AND PRODUCTION IN ELECTRONIC DATA DISCOVERY

(75) Inventors: Pierre Raynaud-Richard, Redwood City, CA (US); Andrey Pogodin, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/017,236

(22) Filed: Jan. 21, 2008

(65) Prior Publication Data

US 2009/0187797 A1    Jul. 23, 2009

(51) Int. Cl.
G06F 17/30 (2006.01)
G06F 11/08 (2006.01)
G06F 3/14 (2006.01)

(52) U.S. Cl. .......... 707/696; 707/769; 707/780; 714/48; 714/57; 715/205

(58) Field of Classification Search .................. None
See application file for complete search history.

(56) References Cited

U.S. PATENT DOCUMENTS

| | | |
|---|---|---|
| 5,355,497 A | 10/1994 | Cohen-Levy |
| 5,608,865 A | 3/1997 | Midgely et al. |
| 5,701,472 A | 12/1997 | Koerber et al. |
| 5,875,431 A | 2/1999 | Heckman et al. |
| 5,903,879 A | 5/1999 | Mitchell |
| 6,115,642 A | 9/2000 | Brown et al. |
| 6,128,620 A | 10/2000 | Pissanos et al. |
| 6,151,031 A | 11/2000 | Atkins et al. |
| 6,173,270 B1 | 1/2001 | Cristofich et al. |
| 6,330,572 B1 | 12/2001 | Sitka |
| 6,332,125 B1 | 12/2001 | Callen et al. |
| 6,343,287 B1 | 1/2002 | Kumar et al. |
| 6,401,079 B1 | 6/2002 | Kahn et al. |
| 6,425,764 B1 | 7/2002 | Lamson |
| 6,539,379 B1 | 3/2003 | Vora et al. |
| 6,607,389 B2 | 8/2003 | Genevie |
| 6,622,128 B1 | 9/2003 | Bedell et al. |
| 6,738,760 B1 | 5/2004 | Krachman |
| 6,805,351 B2 | 10/2004 | Nelson |

(Continued)

OTHER PUBLICATIONS

Human Capital Mangement; "mySAP . . . management"; retrieved from archive.org Aug. 18, 2009 www.sap.com.

(Continued)

Primary Examiner — Shyue Jiunn Hwa
(74) Attorney, Agent, or Firm — Shumaker & Sieffert, P.A.

(57) ABSTRACT

Techniques are provided that enable the display of full text index-ability, indexing, and container extraction status of files in a collection repository in connection with content management. Further, techniques are provided that: guarantee the user knows which files failed to index and explode and which files are not indexable; tell the user which files have not been indexed yet, so they are not omitted from the analysis; allow users to work on the collected files without waiting for maximum possible indexing period; allow users to start working immediately on collected content; allow for displaying indexing and extraction status information relevant only to the search query; allow for automatic and manual update of a list of un-indexable file types; and allow for informing users about the processing status of a collection by sending notifications, displaying alerts, and providing appropriate views.

14 Claims, 8 Drawing Sheets

U.S. PATENT DOCUMENTS

| | | |
|---|---|---|
| 6,832,205 B1 | 12/2004 | Aragones et al. |
| 6,839,682 B1 | 1/2005 | Blume et al. |
| 6,944,597 B2 | 9/2005 | Callen et al. |
| 6,966,053 B2 | 11/2005 | Paris et al. |
| 6,976,083 B1 | 12/2005 | Baskey et al. |
| 7,076,439 B1 | 7/2006 | Jaggi |
| 7,103,602 B2 | 9/2006 | Black et al. |
| 7,104,416 B2 | 9/2006 | Gasco et al. |
| 7,107,416 B2 | 9/2006 | Stuart et al. |
| 7,127,470 B2 | 10/2006 | Takeya |
| 7,162,427 B1 | 1/2007 | Myrick et al. |
| 7,197,716 B2 | 3/2007 | Newell |
| 7,225,249 B1 | 5/2007 | Barry et al. |
| 7,236,953 B1 | 6/2007 | Cooper et al. |
| 7,281,084 B1 | 10/2007 | Todd et al. |
| 7,283,985 B2 | 10/2007 | Schauerte et al. |
| 7,284,985 B2 | 10/2007 | Genevie |
| 7,333,989 B1 | 2/2008 | Sameshima et al. |
| 7,386,468 B2 | 6/2008 | Calderaro et al. |
| 7,433,832 B1 | 10/2008 | Bezos et al. |
| 7,478,096 B2 | 1/2009 | Margolus et al. |
| 7,496,534 B2 | 2/2009 | Olsen et al. |
| 7,502,891 B2 | 3/2009 | Shachor |
| 7,512,636 B2 | 3/2009 | Verma et al. |
| 7,558,853 B2 | 7/2009 | Alcorn et al. |
| 7,580,961 B2 | 8/2009 | Todd et al. |
| 7,594,082 B1 | 9/2009 | Kilday et al. |
| 7,596,541 B2 | 9/2009 | deVries et al. |
| 7,720,825 B2 | 5/2010 | Pelletier et al. |
| 7,730,148 B1 | 6/2010 | Mace et al. |
| 7,742,940 B1 | 6/2010 | Shan et al. |
| 7,895,229 B1 | 2/2011 | Paknad |
| 2001/0053967 A1 | 12/2001 | Gordon et al. |
| 2002/0007333 A1 | 1/2002 | Scolnik et al. |
| 2002/0010708 A1 | 1/2002 | McIntosh |
| 2002/0022982 A1 | 2/2002 | Cooperstone et al. |
| 2002/0035480 A1 | 3/2002 | Gordon et al. |
| 2002/0083090 A1 | 6/2002 | Jeffrey et al. |
| 2002/0091553 A1 | 7/2002 | Callen et al. |
| 2002/0095416 A1 | 7/2002 | Schwols |
| 2002/0103680 A1 | 8/2002 | Newman |
| 2002/0108104 A1 | 8/2002 | Song et al. |
| 2002/0119433 A1 | 8/2002 | Callender |
| 2002/0120859 A1 | 8/2002 | Lipkin et al. |
| 2002/0123902 A1 | 9/2002 | Lenore et al. |
| 2002/0143595 A1 | 10/2002 | Frank et al. |
| 2002/0143735 A1 | 10/2002 | Ayi et al. |
| 2002/0147801 A1 | 10/2002 | Gullotta et al. |
| 2002/0162053 A1 | 10/2002 | Os |
| 2002/0178138 A1 | 11/2002 | Ender et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado |
| 2003/0018520 A1 | 1/2003 | Rosen |
| 2003/0031991 A1 | 2/2003 | Genevie |
| 2003/0033295 A1 | 2/2003 | Adler et al. |
| 2003/0036994 A1 | 2/2003 | Witzig et al. |
| 2003/0046287 A1 | 3/2003 | Joe |
| 2003/0051144 A1 | 3/2003 | Williams |
| 2003/0069839 A1 | 4/2003 | Whittington et al. |
| 2003/0074354 A1 | 4/2003 | Lee et al. |
| 2003/0097342 A1 | 5/2003 | Whittington |
| 2003/0110228 A1 | 6/2003 | Xu et al. |
| 2003/0139827 A1 | 7/2003 | Phelps |
| 2003/0229522 A1 | 12/2003 | Thompson et al. |
| 2004/0002044 A1 | 1/2004 | Genevie |
| 2004/0019496 A1 | 1/2004 | Angle et al. |
| 2004/0034659 A1 | 2/2004 | Steger |
| 2004/0039933 A1 | 2/2004 | Martin et al. |
| 2004/0060063 A1 | 3/2004 | Russ et al. |
| 2004/0068432 A1 | 4/2004 | Meyerkopf et al. |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0103284 A1 | 5/2004 | Barker |
| 2004/0133573 A1 | 7/2004 | Miloushev et al. |
| 2004/0133849 A1 | 7/2004 | Goger |
| 2004/0138903 A1 | 7/2004 | Zuniga |
| 2004/0143444 A1 | 7/2004 | Opsitnick et al. |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0215619 A1 | 10/2004 | Rabold |
| 2004/0260569 A1 | 12/2004 | Bell et al. |
| 2005/0060175 A1 | 3/2005 | Farber et al. |
| 2005/0071251 A1 | 3/2005 | Linden et al. |
| 2005/0074734 A1 | 4/2005 | Randhawa |
| 2005/0114241 A1 | 5/2005 | Hirsch et al. |
| 2005/0125282 A1 | 6/2005 | Rosen |
| 2005/0144114 A1 | 6/2005 | Ruggieri et al. |
| 2005/0165734 A1 | 7/2005 | Vicars et al. |
| 2005/0187813 A1 | 8/2005 | Genevie |
| 2005/0203821 A1 | 9/2005 | Petersen et al. |
| 2005/0240578 A1 | 10/2005 | Biederman, Sr. et al. |
| 2005/0283346 A1 | 12/2005 | Elkins, II et al. |
| 2006/0036464 A1 | 2/2006 | Cahoy et al. |
| 2006/0036649 A1* | 2/2006 | Simske et al. ............... 707/200 |
| 2006/0074793 A1 | 4/2006 | Hibbert et al. |
| 2006/0095421 A1 | 5/2006 | Nagai et al. |
| 2006/0126657 A1 | 6/2006 | Beisiegel et al. |
| 2006/0136435 A1 | 6/2006 | Nguyen et al. |
| 2006/0143248 A1 | 6/2006 | Nakano et al. |
| 2006/0149407 A1 | 7/2006 | Markham et al. |
| 2006/0149735 A1 | 7/2006 | DeBie et al. |
| 2006/0156381 A1 | 7/2006 | Motoyama |
| 2006/0167704 A1 | 7/2006 | Nicholls et al. |
| 2006/0174320 A1 | 8/2006 | Maru et al. |
| 2006/0178917 A1 | 8/2006 | Merriam et al. |
| 2006/0184718 A1 | 8/2006 | Sinclair |
| 2006/0229999 A1 | 10/2006 | Dodell et al. |
| 2006/0230044 A1 | 10/2006 | Utiger |
| 2006/0242001 A1 | 10/2006 | Heathfield |
| 2007/0016546 A1* | 1/2007 | De Vorchik et al. ............... 707/1 |
| 2007/0048720 A1 | 3/2007 | Billauer |
| 2007/0061156 A1 | 3/2007 | Fry et al. |
| 2007/0061157 A1 | 3/2007 | Fry et al. |
| 2007/0078900 A1 | 4/2007 | Donahue |
| 2007/0099162 A1 | 5/2007 | Sekhar |
| 2007/0100857 A1 | 5/2007 | DeGrande et al. |
| 2007/0112783 A1 | 5/2007 | McCreight et al. |
| 2007/0156418 A1 | 7/2007 | Richter et al. |
| 2007/0162417 A1 | 7/2007 | Cozianu et al. |
| 2007/0203810 A1 | 8/2007 | Grichnik |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0271517 A1 | 11/2007 | Finkelman et al. |
| 2007/0282652 A1 | 12/2007 | Childress et al. |
| 2007/0288659 A1 | 12/2007 | Zakarian et al. |
| 2008/0033904 A1 | 2/2008 | Ghielmetti et al. |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |
| 2008/0126156 A1 | 5/2008 | Jain et al. |
| 2008/0148346 A1 | 6/2008 | Gill et al. |
| 2008/0195597 A1* | 8/2008 | Rosenfeld et al. ............... 707/5 |
| 2008/0229037 A1 | 9/2008 | Bunte et al. |
| 2008/0294674 A1* | 11/2008 | Reztlaff et al. ............... 707/102 |
| 2008/0301207 A1 | 12/2008 | Demarest et al. |
| 2008/0312980 A1 | 12/2008 | Boulineau et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1 | 2/2009 | Yao |
| 2009/0106815 A1 | 4/2009 | Brodie et al. |
| 2009/0119677 A1 | 5/2009 | Stefansson et al. |
| 2009/0150866 A1 | 6/2009 | Schmidt |
| 2009/0150906 A1 | 6/2009 | Schmidt et al. |
| 2009/0193210 A1 | 7/2009 | Hewett et al. |
| 2010/0070315 A1 | 3/2010 | Lu et al. |

OTHER PUBLICATIONS www.pss-systems.com; retrieved from www. Archive.org any linkage dated Dec. 8, 2005, 131 pages.

PSS Systems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

PSS Systems, Inc., Preservation Benchmarks for 2007 and Beyond, www.pss-systems.com, pp. 1-3 (2007).

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Litigation Communications and Collections, www.pss-systems.com (2006), retrieved online on Dec. 8, 2010 from archive.org, 1 page.

Zhu, et al.; "Query Expansion Using Web Access Log Files"; Lecture Notes in Computer Science, 2005, vol. 3588/2005, pp. 686-695, Springer-Verlag Berlin Hedelberg.

* cited by examiner

Search collected files

Matter: John Smith vs. XYZ     Discovery request: Request 1

Created date

From [ ]   To [ ]

Keywords [ ]

[Search]

Processing status for entire collection
- Failed to extract files from 12 containers
- haven't yet extracted files from 32 containers

Figure 2

Search collected files

Matter: John Smith vs. XYZ    Discovery request: Request 1

Created date

From  01/01/2006   To  01/01/2007

Keywords  John smith

Search

Processing status for files affecting your query results
Your search results may be incomplete because of the following

- Failed to extract files from 2 containers
- Haven't yet extracted files from 1 containers
- 23 files are not indexable
- 1 file failed to index Search results

| File1.txt | File2.txt | File3.txt | File4.txt | File5.txt | File6.txt | File7.txt |
| File8.txt | File9.txt | File10.txt | File11.txt | Fil12.txt | File13.txt | File14.txt |
| File15.txt | File16.txt | File17.txt | File18.txt | File19.txt | File20.txt | File21.txt |

Figure 3

View import log

Matter: John Smith vs. XYZ
Discovery request: Request 1
Logged on: 01/05/2007
Logged by: Pat Rose
Custodial system: centera23

Uploaded files:

| File | Status | Error |
|---|---|---|
| Readme.txt | | |
| Resume.doc | | |
| Admin_guide.rtf | | |
| My_archive.zip | Extraction failed | Password protected |
| Old_archive.zip | Extraction failed | Corrupt |

Figure 4

File details

| | |
|---:|:---|
| Name: | My_archive.zip |
| Description: | N/A |
| Type: | Archive/ZIP |
| Size (bytes): | 1243423434 |
| Hash: | 21 321 31 2321 21 23232131 231 23213231 231 2321 321 |
| Created on: | 01/01/2004 |
| Modified on: | 01/09/2004 |
| Last accessed on: | 01/09/2004 |
| Contained within: | N/A |

⚠ File is not indexable

⚠ Files have not been extracted from this container yet

Figure 7

Affected files

Matter: John Smith vs. XYZ     Discovery request: Request 1

Created date:
From 01/01/2006     To 01/01/2007
Keywords:  John smith

Back to search results

⚠ 7 files are not indexable

List of files

File1.jpg    File2.gif    File3.png    File4.pst

File5.jpg    File6.bmp    File7.tiff

PROVIDING COLLECTION TRANSPARENCY INFORMATION TO AN END USER TO ACHIEVE A GUARANTEED QUALITY DOCUMENT SEARCH AND PRODUCTION IN ELECTRONIC DATA DISCOVERY

BACKGROUND OF THE INVENTION

1. Technical Field

The invention relates to electronic data discovery. More particularly, the invention relates to the evaluation of the processing, i.e. full text indexing and archive extraction, status of digital content collected for electronic data discovery purposes. Still more particularly, the invention relates to a method and apparatus for providing collection transparency information to an end user to achieve a guaranteed quality document search and production in electronic data.

2. Description of the Prior Art

Electronic discovery, also referred to as e-discovery or EDiscovery, concerns discovery in civil litigation, as well as Tax, Government Investigation, and Criminal Proceedings which deals with information in electronic form. In this context, electronic form is the representation of information as binary numbers. Electronic information is different from paper information because of its intangible form, volume, transience, and persistence. Such information is typically stored in a content repository. Also, electronic information is usually accompanied by metadata, which is rarely present in paper information. Electronic discovery poses new challenges and opportunities for attorneys, their clients, technical advisors, and the courts, as electronic information is collected, reviewed, and produced. Electronic discovery is the subject of amendments to the Federal Rules of Civil Procedure which are effective Dec. 1, 2006. In particular Rules 16 and 26 are of interest to electronic discovery.

Examples of the types of data included in e-discovery include e-mail, instant messaging chats, Microsoft Office files, accounting databases, CAD/CAM files, Web sites, and any other electronically-stored information which could be relevant evidence in a law suit. Also included in e-discovery is raw data which forensic investigators can review for hidden evidence. The original file format is known as the native format. Litigators may review material from e-discovery in one of several formats: printed paper, native file, or as TIFF images.

Content Repository Uncertainty with File Indexing Status

A typical content repository, i.e. content storage, has certain problems that impair search results and that may cause problems in EDiscovery Uncertainty with File Indexing Status Usually, indexing status of a content repository is estimated in the following ways:

Optimistic—The system ignores the fact that some files may not be available in the search results. Even high-end content management systems, such as Documentum (see, for example, http://software.emc.com/), use this approach.

Pessimistic—The content is considered non-indexed and the system does not allow user to search it until a certain long period of time passes after content insertion or update to make sure there is enough time for indexing engine to index the content.

Some systems try to go beyond these two approaches by warning the user what files are still in the indexing queue.

The optimistic approach is entirely unsafe when it comes to importing or indexing very large files. For example, in Oracle 9i it takes up to several minutes to index a very large document, and it takes several seconds to put large files into indexing queue. This makes the optimistic approach undesirable for EDiscovery. Failure to index files causes incorrect search results for both approaches.

None of the applications on the market implement a comprehensive processing status information solution that combines index-ability, indexing status, and container extraction, e.g. opening of such files as zip files, status information.

An EDiscovery Management Application (EMA) is a content management system responsible for managing collections and holds, which communicates collection and hold requests to data sources, and which collects content from data sources (see related U.S. patent application Ser. No. 11/963, 383, filed on Dec. 21, 2007, the entirety of which is incorporated herein by this reference thereto). Some files collected into an EMA content repository during the EDiscovery process must undergo full text indexing to allow their contents to become searchable by the end user. However, the following limitations with this approach to indexing should be noted:

AP: I changed the last sentence because otherwise it sounds like we are criticizing some approach, which we are going to reject. Whereas, these are natural limitation of every indexing process.

It takes time to perform indexing. During this time files that have not been indexed yet cannot be found through a full-text search.

Indexing may fail for some files. As a result, the user may not be able to find these files through full text search.

Some files may not be indexable because they do not contain text information or because the indexing engine is unable to index these files.

Uncertainty with Container Extraction Status

Extracting files from container files, such as ZIP, CAB, WAR, RAR, EAR file archives, PST, NSF email archives, email message MSG files, and others, collected into an EMA content repository during the collection process creates even more uncertainty when it comes to understanding the processing status of files in the content repository. For example, the following limitations should be noted:

First, it takes time for an EMA to explode the container, i.e. extract files from a container into the content repository. Until the container is exploded, the files cannot be found through any type of search because the content repository does not know about their existence.

Secondly, the extraction may fail for a multitude of reasons, such as an inability to extract files from a password protected or corrupt archive. A user should be able to distinguish between a container that does not contain files and that, therefore does not present any interest from an eDiscovery perspective, and a container that failed to explode but that may contain files that are of interest for eDiscovery.

Finally, files inside a container might become indexable only after they have been extracted from a container. This generates additional delay in file indexing and may result in a user being unable to perform a full text search against files uploaded inside the container.

In EDiscovery, failing to find and produce files may result in substantial litigation risks and penalties. This is why it is very important to understand the indexing and extraction status of content collection in EDiscovery precisely. For example, the failure of a defendant to locate an email message that was saved by the plaintiff may be treated by the court as negligent misconduct or an attempt to hide evidence, and may result in heavy penalties.

Users Need to Access Processing Status Information in a User-Friendly Form

Both file indexing and container extraction status information should be available to a user performing the file search to allow the user to understand the processing status of the collected content and make decisions on completeness of file search results. Also, because the overall size of the collection may be huge, processing status information must be tailored for the subset of data the user tries to query when a search is performed. Finally, the user should know which files may contain the information specified in the query criteria, although the collection repository cannot search these files; and there should be a way for a user to browse and view files that failed to index, not indexable, or have not been indexed yet and containers that failed to explode or have not been exploded yet manually by viewing the files.

In this context, it would be advantageous to provide collection transparency information to an end user to achieve a guaranteed quality document search and production in electronic data.

SUMMARY OF THE INVENTION

An embodiment of the invention displays full text indexability, indexing, and container extraction status of files in a collection repository in connection with content management in EDiscovery.

As opposed to the optimistic and pessimistic approaches the inventive technique disclosed herein guarantees that the user knows which files failed to index and explode and which files that are not indexable.

As opposed to the optimistic approach, the invention provides a technique that tells the user which files have not been indexed yet, so they are not omitted from the analysis.

As opposed to the pessimistic approach, the invention provides a technique that allows users to start working on the collected files without waiting for the maximum possible indexing period. Further, as opposed to the pessimistic approach, the invention provides a technique that allows users to start working immediately on the collected content, thus avoiding slowing down the work during frequent updates to the content repository.

An embodiment of the invention allows for displaying indexing and extraction status information that is relevant only to the search query, thus minimizing the time needed to analyze the files that are not indexed or not exploded manually.

An embodiment of the invention also allows for automatic and manual update of a list of un-indexable file types based on historical information collected during collection repository operation, thus enhancing the user experience with time and adapting the EMA to new file types.

Finally, an embodiment of the invention allows for keeping both the person who performed the collection and the person who manages the EDiscovery effort informed about the processing status of the collection by sending notifications, displaying alerts, and by providing appropriate views.

BRIEF DESCRIPTION OF THE DRAWINGS

FIG. 2 is a screen shot that displays container extraction status in a processing status area according to the invention;

FIG. 3 is a screen shot that displays processing status for the results of content search query according to the invention;

FIG. 4 is a screen shot that displays an import log containing the list of files imported to an EMA and processing status warnings next to a file according to the invention;

FIG. 7 is a screen shot that displays processing status warnings on a file detail page according to the invention.

DETAILED DESCRIPTION OF THE INVENTION

Terms

Figure 1:
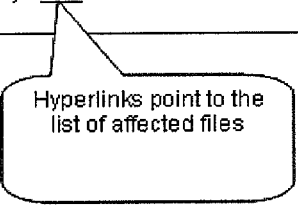
FIG. 1 is a screen shot that displays a processing area displaying warnings on files that have not been indexed yet, and files that are not indexable according to the invention.

For purposes of the discussion herein, the following terms have the meaning associated therewith:

Electronic Data Discovery (e-discovery or EDiscovery) is discovery of electronically stored evidence in civil litigation, as well as tax, government investigation, and criminal proceedings.

EDiscovery Management Application (EMA). A system responsible for managing the electronic discovery process and storing the collected content in the content repository.

Discussion of Preferred Embodiments

Documents collected for EDiscovery undergo a certain transformation inside the collection repository. Namely:

Content of container files may be extracted into the content repository. Note that container files may contain other container files whose content must also be extracted into the content repository.

Certain files can undergo full text indexing for future full text search.

Sometimes these transformations may fail. For example, when an indexing engine times out and fails to index a file, or when an archive is password protected. Also, these transformations cannot be performed instantly. As a result, after a file import, some of the files that are supposed to be indexed may stay un-indexed, and some containers that are supposed to be exploded may stay un-exploded for a certain period of time. This can create a situation when a user failed to find or view a file that is supposed to be found for the purposes of litigation. For example, a file containing a certain word combination is not displayed in the full text search results because it has not been indexed properly, or even because it has not been extracted from a container. This may cause significant legal consequences, for example, in the situation when a defendant has an obligation to produce a document.

In an embodiment of the invention, the EMA displays the indexing status of files pertaining to a given matter or legal request in the content repository. This display is provided in a processing status area of the search results page. Files in the content repository can be classified, for example, the following way when it comes to full text index-ability and indexing state:

1. Not indexable: The EMA knows that certain types of files are not indexable and does not try to perform full-text indexing on them. For example, JPEG files are known not to be indexable.

2. Indexable, but not indexed yet: The EMA tries to index these files but, for some reason, they have not been indexed yet by the EMA.

3. Failed to index: The EMA considered these files indexable but, for some reason, the indexing attempt failed. Note that this category can be further subdivided into the following sub-categories:

Files that failed to index because they were corrupted;

Files that are failed to index because of indexing engine limitations, e.g. too large; and Files that are mistakenly considered indexable because, for example, multiple file formats use the same file extension or because of a setup error in the indexing engine.

4. Indexable and Indexed: The EMA Successfully Indexed these Files

The EMA can extract indexing state and index-ability information from the content repository. For example, in Oracle, index-ability information is stored in a specially defined "IGNORE" field, and indexing status information can be extracted from Oracle Context Views. Note that each database product usually exposes some data that allows a programmer to derive full text indexing status. If some data are unavailable, there are ways to approximate this information.

FIG. 1 is a screen shot that displays a processing area displaying warnings on files that have not been indexed yet, and files that are not indexable according to the invention. When user tries to search for files in the EMA content repository, the repository UI determines whether there are files and/or how many files reside in the above defined indexing states 1, 2, and 3. The UI then displays appropriate warning and error messages to the user, as well as hyperlinks to affected files.

In another embodiment, the EMA displays the container extraction status of container files pertaining to a given matter or legal request residing in the EMA content repository. This display is provided in a processing status area of the search results page. More generally, summary information is provided on a search results page. Thus, the EMA can read container extraction status from the content repository and display this information as error or warning messages in the processing status area of the content repository view page. FIG. 2 is a screen shot that displays container extraction status in a processing status area according to the invention.

Extraction status can be stored in the EMA content repository in many ways. For example, the Atlas LCC has a status field that is originally set to "N" (not extracted). Once files are extracted from the container, the container extraction status is changed to "Y." If the extraction failed, then the value is changed to "X."

In another embodiment, the EMA displays the indexing status and/or container extraction status warnings and errors only for the files that may affect search results. This display is provided in the processing status area of the search results page. In the above described embodiments, the EMA displayed indexing and extraction information against all the files collected for a given legal matter or document discovery request. This information becomes overwhelming when where are many files collected for a given matter and request. Therefore, the EMA can display indexing and extraction status information only for the files that may have affected a current search query. These files include, for example, the files for which the EMA could not evaluate whether the file match certain parts of the search criteria.

FIG. 3 is a screen shot that displays processing status for the results of content search query according to the invention. For example, a user searches for a phrase "John Smith" in the content repository that stores collected documents for Case "John Smith vs. XYZ, Inc" and Discovery Request "Request 1." There are one million files collected for this discovery request. The search page allows the user to specify modified-date range of the file, i.e. Jan. 1, 2005-Jan. 1, 2006. If a file is not indexed, it may contain the keywords that the user is looking for, but the EMA cannot check it. If the container has not been exploded, it may contain files that include the keywords user is looking for, but the EMA cannot check it. Even if the user is searching file modification dates or file names, the container can contain the files that match the search criteria, but the EMA has no way to check that.

To produce guaranteed search results, EMA must display the files that meet all the search parameters, except those that the EMA cannot check because of the file's bad processing status. In the example above, the EMA displays indexing warnings and errors to the end user for all files that failed to index, not indexed yet, and optionally the files that are known as un-indexable that belong to case "John Smith vs. XYZ, Inc", discovery request "Request 1," and that were created between Jan. 1, 2005 and Jan. 1, 2006, assuming that these files may contain the information about "John Smith."

Displaying warnings on un-indexable files is optional because the user may understand that certain files are not subject to a full text search, e.g. JPEG files. Thus, such a warning may not be useful.

The system also displays warnings and errors to the end user for all containers that failed to explode or that have not been exploded yet for the case "John Smith vs. XYZ, Inc" and Discovery Request "Request 1" because these containers may contain files the user tries to search for, i.e. files modified between Jan. 1, 2005 and Jan. 1, 2006 and containing keywords "John Smith," but there is no way for the EMA to figure that out.

To summarize this, the set of files returned to the end user comprises:

Files that meet all the search criteria; and

Not indexed files that meet all search criteria except for keyword search criteria applied to the body of the file; and Containers that are not exploded that meet all search criteria, except for keyword search criteria applied to the body of the files inside the container and file metadata search criteria applied to the files inside the container.

For purposes of the discussion herein, the term file metadata search criteria refers to file properties of the contained files, such as name, extension, size, location, modified date, created date, last accessed date, and the criteria that can be derived during file extraction, such as hash value and digital signature.

Figure 5:
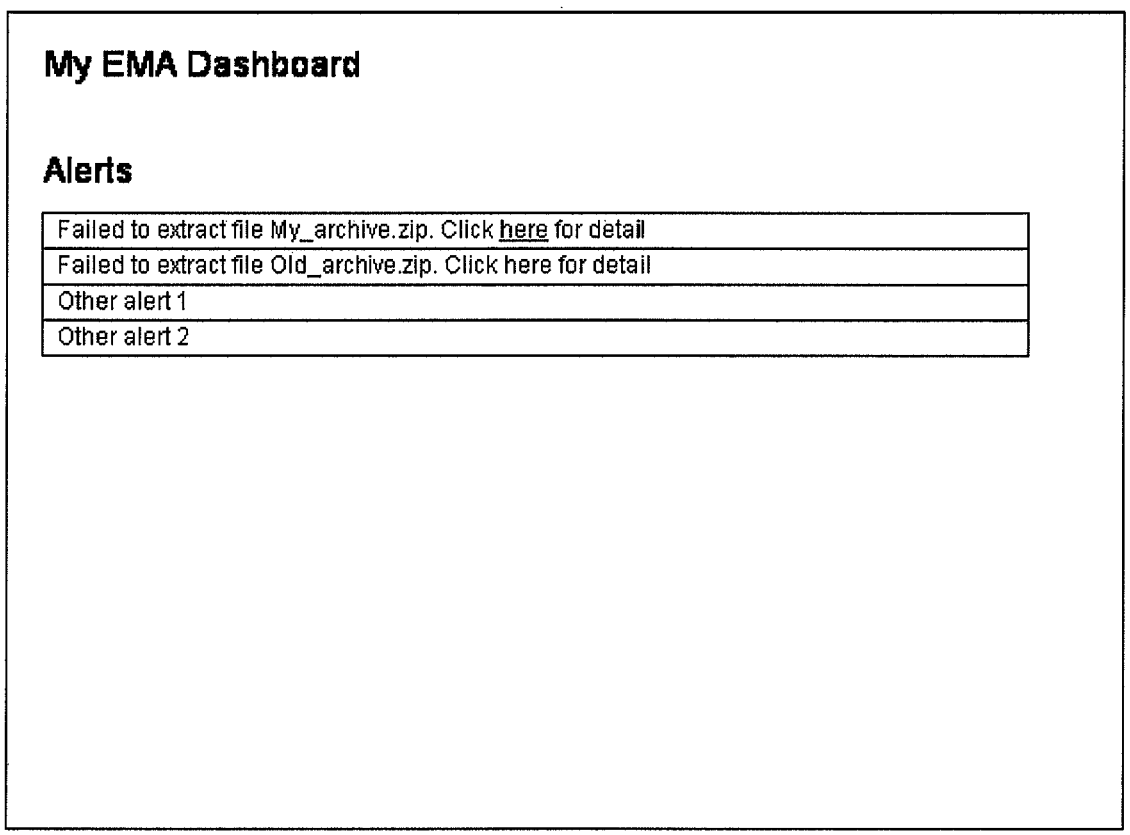
FIG. 5 is a screen shot that displays an alert at an EDiscovery coordinator alert page according to the invention.

In another embodiment of the invention, the EMA displays the list of containers which failed to explode to the user who uploaded the containers into the EMA. Users who performed the collection, i.e. uploaded files to the EMA, can view the processing status of the files they have uploaded to the EMA content repository so they can promptly resolve the issues. For example, they can re-upload zip archives that failed to be exploded because of password protection, or they can provide the password as a note in the collection log. FIG. 4 is a screen shot that displays an import log containing the list of files imported to an EMA and processing status warnings next to a file according to the invention In another embodiment of the invention, the EMA notifies the user who uploaded containers to the EMA and users responsible for coordinating the EDiscovery effort of the fact that some containers failed to explode. FIG. 5 is a screen shot that displays an alert at an EDiscovery coordinator alert page according to the invention. In this embodiment, the EMA sends email notifications and displays alerts on an EMA alert page when certain containers failed to explode so that users who uploaded the files and users who coordinate the EDiscovery effort are notified of these events and can act accordingly.

Figure 6:
FIG. 6 is a screen shot that displays processing status warnings on a search result page according to the invention.

In another embodiment of the invention, the EMA displays a processing status warning next to a file entry so the user can see what processing problems occurred with each file. This can be done both on a search results page and on a file detail information page. FIG. 6 is a screen shot that displays processing status warnings on a search result page according to the invention; and FIG. 7 is a screen shot that displays processing status warnings on a file detail page according to the invention.

In another embodiment of the invention, the EMA collects and presents information on what file types are not indexable by collecting the statistics of indexing failure per file type. Indexing failure may happen, for example, for any of the following reasons:

The file was of an indexable type but was corrupt;
The file was of an indexable type but the indexing engine failed, e.g. indexing expired because file was too long;
Files of different types, e.g. A-indexable and B-un-indexable, use the same file extension. As a result, the indexing engine treats a file of type B as type A, tries to index it, and fails;
The file was treated by the EMA as indexable but, in reality, this was not an indexable file type. For example, an administrator forgot to include a file extension for a new image format into "do not index" list.

When indexing fails, it is hard to determine the reason. However, there is a need to improve indexing capabilities gradually and minimize false positives by making sure that the EMA does not attempt to index un-indexable files. Usually, the EMA maintains a list of file types that are not supposed to be indexed. However, new file types may arrive and the EMA administrator needs to receive information on whether these file types are indexable or not. This can be done by observing indexing failure statistics. Over time, the EMA collects, for example, the following information per file type:

How many files of each type were indexed successfully;
How many files of each type failed to index; and
How many files of each type have been uploaded.

Based on this information, the system calculates the ratio of indexing failure, which can be described by the following formula:

> Ratio of failure of a given type=number of failed files of a given type/number of files of a given type uploaded and attempted to index This information can be reported to the administrator so that file types having a high ratio can be added to a "do not index" list. For example, if the ratio is close to 1, this is definitely not an indexable file type. If the ratio is between 0.2 and 0.8, here the numbers are arbitrary, indexable and un-indexable file types may have the same file extension. If the ratio is low but not 0, a majority of files of this type are getting indexed, but there may be problems with indexing engine timeout or some files may be corrupt.

Another Formula that may be Used for this Purpose is as Follows:

> Ratio of failure of a given type=number of failed files of a given type/number of files of a given type successfully indexed This formula can be derived from the previous formula. The decision points equivalent to those described above are, for example:

Infinity—file type is not indexable
0.25-4—files of multiple types have the same extension
0—files type is indexable The EMA can automatically (or semi automatically, by presenting the information to the administrator and letting the administrator decide) update the "do not index list" with file types that proved to have high ratio of failure. A high ratio of failure can be determined through comparison against a threshold value. The EMA may also postpone the decision until it achieves a representative sample, i.e. a large enough number files of the same type being uploaded and attempted to index. This makes the statistics credible.

Figure 8:
FIG. 8 is a screen shot that displays an affected files page, presumably accessed through a link inside the error message in a processing status area of the search results page according to the invention.

In another embodiment of the invention, the EMA provides a separate view containing the list of files that have questionable status. FIG. 8 is a screen shot that displays an affected files page, presumably accessed through a link inside the error message in a processing status area of the search results page according to the invention. A warning or error message in the processing status area leads to an "effected files" page, which displays the list of files affected by this warning or error condition.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for providing collection transparency information to an end user to achieve a guaranteed quality document search and production in electronic data discovery, comprising the steps of:
providing a content management system configured for performing the steps of:
providing a search results page;
extracting indexing state and text index-ability information from a content repository with regard to files identified on said search results page;
classifying said files in said content repository with regard to text index-ability and indexing state as follows:
not indexable: types of files that are known not to be indexable and wherein said content management system does not attempt to perform full-text indexing on said types of files to enhance user experience with time;
indexable, but not indexed yet: indexable files that have not been indexed yet;
failed to index: files that are considered to be indexable for which an indexing attempt failed; and
indexable and indexed: files that were successfully indexed;
wherein text index-ability is any of: not indexable and indexable and wherein indexing state is any of: indexed, not indexed yet, and failed to index;
collecting statistical information on what file types are not indexable by collecting statistics of indexing failure per file type, said indexing failure per file type based on whether:
a file was of an indexable type but was corrupt;
a file was of an indexable type but indexing failed;
files of different types use a same file extension; and
a file was treated as indexable but it was not an indexable file type;
observing said collected statistics of indexing failure per file type by, over time, collecting the following information per file type:
how many files of each type were indexed successfully;
how many files of each type failed to index; and how many files of each type have been uploaded;

based on said observance of said collected statistics of indexing failure per file type, calculating a ratio of indexing failure in accordance with the following formula:

ratio of failure of a given type=number of failed files of a given type/number of files of a given type uploaded and attempted to index;

reporting file types having a high indexing failure ratio;

classifying said file types having a high indexing failure ratio as not indexable and adding said file types to a do not index list;

displaying indexing and extraction status of files contained in said content repository and pertaining to a given matter or legal request or a particular search query in the processing status area of the search results page based upon said classifying said files, as well as said extracting indexing state and text index-ability information from said content repository; and providing a processing status area of said search results page and a file detail information page for displaying a processing status warning next to a file entry to allow a user to see what processing problems occurred with each file;

wherein the steps of the method are performed on one or more computing devices.

2. The method of claim 1, further comprising the step of: providing a processing area displaying warnings or error messages on files that have not been indexed yet, files that are not indexable, and files that failed to index.

3. The method of claim 2, wherein the processing area displays hyperlinks to affected files.

4. The method of claim 1, further comprising the step of: providing a processing area displaying as error or warning messages container extraction status of container files residing in said content repository that pertain to a given matter or legal request.

5. The method of claim 1, further comprising the step of: providing a processing area displaying indexing status or container extraction status warnings and errors only for the files that affect search results.

6. The method of claim 5, said step for providing the processing area displaying indexing status or container extraction status warnings and errors comprising:
    returning a set of files to an end user that comprises only:
    files that meet all the search criteria; or
    not indexed files that meet said all the search criteria except for keyword search criteria applied to a body of the file; or
    containers that are not exploded that meet said all the search criteria, except for keyword search criteria applied to a body of the files inside the container and file metadata search criteria applied to the body of the files inside the container.

7. The method of claim 1, further comprising the step of: notifying a user who uploaded containers to said content repository or users responsible for coordinating said electronic data discovery effort that some containers failed to explode.

8. The method of claim 1, further comprising the step of: providing a processing area comprising any of a search results page and a file detail information page for displaying a processing status warning next to a file entry to allow a user to see what processing problems occurred with each file.

9. The method of claim 1, further comprising the step of: calculating a ratio of indexing failure in accordance with the following formula:

ratio of failure of a given type=number of failed files of the given type/number of files of the given type successfully indexed.

10. The method of claim 1, further comprising the step of: automatically updating said do not index list with file types that have high ratio of failure as determined through comparison against a threshold value.

11. The method of claim 1, further comprising the step of: postponing a decision to update said do not index list until a representative sample of files of a same type are uploaded and attempts to index said files fail.

12. The method of claim 1, further comprising the step of: providing a separate view containing a list of files that have questionable status.

13. The method of claim 1, the classification of files that failed to index further comprising any of the following subcategories:
    files that failed to index due to file corruption;
    files that are failed to index because of indexing engine limitations; and
    files that are mistakenly considered indexable.

14. The method of claim 1, further comprising the step of: providing a processing area displaying a list of containers which failed to unpack to a user who uploaded said containers to said content repository.

* * * * *